United States Patent
Choudhary et al.

(10) Patent No.: US 10,248,478 B2
(45) Date of Patent: Apr. 2, 2019

(54) INFORMATION PROCESSING DEVICE AND SPECIFICATION CREATION METHOD

(71) Applicant: FUJITSU LIMITED, Kawasaki-shi, Kanagawa (JP)

(72) Inventors: Shridhar Choudhary, Kawasaki (JP); Kosaku Kimura, Kawasaki (JP); Atsuji Sekiguchi, Kawasaki (JP); Tadahiro Uehara, Yokohama (JP); Yusuke Sasaki, Kawasaki (JP); Masaru Ueno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 15/651,604

(22) Filed: Jul. 17, 2017

(65) Prior Publication Data
US 2018/0095810 A1    Apr. 5, 2018

(30) Foreign Application Priority Data
Sep. 30, 2016 (JP) .................... 2016-194423

(51) Int. Cl.
*G06F 9/54* (2006.01)

(52) U.S. Cl.
CPC .................... *G06F 9/547* (2013.01)

(58) Field of Classification Search
None
See application file for complete search history.

(56) References Cited

U.S. PATENT DOCUMENTS

| 9,342,327 | B1* | 5/2016 | Reddy | G06F 9/44521 |
| 2003/0191803 | A1* | 10/2003 | Chinnici | G06F 9/547 709/203 |
| 2007/0094676 | A1* | 4/2007 | Fresko | G06F 9/547 719/330 |

FOREIGN PATENT DOCUMENTS

JP    2009-230618    10/2009

OTHER PUBLICATIONS

Swagger-maven-plugin; URL:http://kongchen.github.io/swagger-maven-plugin/; Sep. 12, 2016.

* cited by examiner

*Primary Examiner* — Craig C Dorais
(74) *Attorney, Agent, or Firm* — Staas & Halsey, LLP

(57) ABSTRACT

A relationship analyzing unit generates an assumed endpoint based on class relationship information. A log analyzing unit refers to the class relationship information and extracts noun-verb information from an access log, and an actual endpoint generating unit generates an actual endpoint by converting a verb in the noun-verb information into an HTTP method name and converting a noun therein into a path. A merge unit identifies an endpoint included in assumed endpoints generated by the relationship analyzing unit, as a specification endpoint, among actual endpoints.

7 Claims, 21 Drawing Sheets

FIG.4

| pa: INTERFACE | MULTIPLICITY OF pa | | pb: INTERFACE | DIRECTED ASSOCIATION | | | | BIDIRECTED ASSOCIATION | | | | BASIC AGGREGATION | | COMPOSITION AGGREGATION | | INHERIT-ANCE |
|---|---|---|---|---|---|---|---|---|---|---|---|---|---|---|---|---|
| | ONE | MANY | | ONE TO MANY | ONE TO ONE | MANY TO ONE | MANY TO MANY | ONE TO MANY | ONE TO ONE | MANY TO ONE | MANY TO MANY | ONE TO ONE | ONE TO MANY | ONE TO ONE | ONE TO MANY | |
| /pa | | | /pa | | | | | | | | | | | | | |
| /pa*:id | x | | /pa/:id | | | | | | | | | | | | | |
| /pa*:id/pb | x | | /pa/:id/pb* | | | | | | | | | | | | | x |
| /pa*:id/pb/:id | x | | /pa/:id/pb*:id | | x | | | | | | | | | x | | x |
| /pa*/pb | | x | /pa/pb* | | | | | | | | | | | | x | x |
| /pa*/pb/:id | | x | /pa/pb*/:id | | | | | | | x | | | x | | | x |
| /pb | | | /pb* | | | | | | x | | | | | x | | |
| /pb/:id | | | /pb*/:id | | | | | | x | x | | | | | | |
| /pb/:id/pa | x | | /pb*/:id/pa | x | x | x | x | x | x | | | x | x | x | x | x |
| /pb/:id/pa*/:id | x | | /pb*/:id/pa*/:id | x | x | x | x | x | | | x | x | x | x | x | x |
| /pb/pa | | x | /pb*/pa | x | x | x | x | | | | x | x | x | x | x | x |
| /pb/pa*/:id | | x | /pb*/pa*/:id | x | x | x | x | | | | x | x | x | x | x | x |

FIG.5

| CLASS pa | Account | Account | Customer | Customer | Operator | Order | Service* | Service* | Order |
|---|---|---|---|---|---|---|---|---|---|
| CLASS pb | Operator | Customer | Order | Product | Order | Service* | Optional-Service | Discount-Service | Product |
| /pa | | | | | | | | | |
| /pa/:id | | x | | | | | | | |
| /pa/:id/pb | x | x | | | | | | | |
| /pa/:id/pb/:id | x | x | | | | | | | |
| /pa/pb | x | | x | x | x | x | | | |
| /pa/pb/:id | x | | x | x | x | x | | | x |
| /pb | | | | | | x | x | x | |
| /pb/:id | | | | | | x | x | x | |
| /pb/:id/pa | x | | x | x | x | x | x | x | x |
| /pb/:id/pa/:id | x | | x | x | x | x | x | x | x |
| /pb/pa | x | | x | x | x | x | x | x | x |
| /pb/pa/:id | x | | x | x | x | x | x | x | x |

FIG.6

| (a) ALL GENERABLE URLs | | |
|---|---|---|
| CLASS pa | Account | |
| CLASS pb | Operator | |
| /pa | /accounts | |
| /pa/:id | /accounts/:id | |
| /pa/:id/pb | /accounts/:id/operators | |
| /pa/:id/pb/:id | /accounts/:id/operators/:id | |
| /pa/pb | /accounts/operators | |
| /pa/pb/:id | /accounts/operators/:id | |
| /pb | /operators | |
| /pb/:id | /operators/:id | |
| /pb/:id/pa | /operators/:id/accounts | |
| /pb/:id/pa/:id | /operators/:id/accounts/:id | |
| /pb/pa | /operators/accounts | |
| /pb/pa/:id | /operators/accounts/:id | |

| (b) URLs AFTER UNEXPECTED URLs ARE EXCLUDED | |
|---|---|
| CLASS pa | Account |
| CLASS pb | Operator |
| /pa | /accounts |
| /pa/:id | /accounts/:id |
| /pa/:id/pb | × |
| /pa/:id/pb/:id | × |
| /pa/pb | × |
| /pa/pb/:id | × |
| /pb | /operators |
| /pb/:id | /operators/:id |
| /pb/:id/pa | × |
| /pb/:id/pa/:id | × |
| /pb/pa | × |
| /pb/pa/:id | × |

FIG.7

| # | URL |
|---|---|
| 1 | /accounts |
| 2 | /accounts/:id |
| 3 | /operators |
| 4 | /operators/:id |
| 5 | /customers |
| 6 | /customers/:id |
| 7 | /customers/:id/orders |
| 8 | /customers/:id/orders/:id |
| 9 | /orders |
| 10 | /orders/:id |
| 11 | /customers/:id/products |
| 12 | /customers/:id/products/:id |
| 13 | /products |
| 14 | /products/:id |
| 15 | /operators/:id/orders |
| 16 | /operators/:id/orders/:id |
| 17 | /orders/:id/optional-services |
| 18 | /orders/:id/optional-services/:id |
| 19 | /orders/:id/discount-services |
| 20 | /orders/:id/discount-services/:id |
| 21 | /orders/:id/products |

FIG.9A

```
h=10.25.171.138 u=... u=... t=[20/Nov/2015:09:55:34 +0900] "r=POST /login.action HTTP/1.1
h=10.25.171.138 u=... u=... t=[20/Nov/2015:09:55:44 +0900] "r=POST /menu.action HTTP/1.1
h=10.25.171.138 u=... u=... t=[20/Nov/2015:09:56:14 +0900] "r=POST /view-customer-info.action HTTP/1.1
h=10.25.171.138 u=... u=... t=[20/Nov/2015:09:56:34 +0900] "r=POST /edit-customer-info.action HTTP/1.1
h=10.25.171.138 u=... u=... t=[20/Nov/2015:09:57:54 +0900] "r=POST /menu.action HTTP/1.1
h=10.25.171.138 u=... u=... t=[20/Nov/2015:09:57:12 +0900] "r=GET /logout.action HTTP/1.1
h=10.25.171.138 u=... u=... t=[20/Nov/2015:10:55:34 +0900] "r=POST /login.action HTTP/1.1
h=10.25.171.138 u=... u=... t=[20/Nov/2015:10:56:38 +0900] "r=POST /menu.action HTTP/1.1
h=10.25.171.138 u=... u=... t=[20/Nov/2015:10:56:40 +0900] "r=POST /search-product.action HTTP/1.1
h=10.25.171.138 u=... u=... t=[20/Nov/2015:10:59:34 +0900] "r=POST /view-product.action?id=1 HTTP/1.1
h=10.25.171.138 u=... u=... t=[20/Nov/2015:10:59:54 +0900] "r=POST /edit-cart.action HTTP/1.1
h=10.25.171.138 u=... u=... t=[20/Nov/2015:11:01:34 +0900] "r=POST /create-order.action HTTP/1.1
h=10.25.171.138 u=... u=... t=[20/Nov/2015:11:02:28 +0900] "r=POST /confirm-order.action?id=2&discount-service=122 HTTP/1.1
h=10.25.171.138 u=... u=... t=[20/Nov/2015:11:02:56 +0900] "r=POST /succeed-order.action HTTP/1.1
h=10.25.171.138 u=... u=... t=[20/Nov/2015:11:03:00 +0900] "r=POST /menu.action HTTP/1.1
h=10.25.171.138 u=... u=... t=[20/Nov/2015:11:03:02 +0900] "r=POST /logout.action HTTP/1.1
h=10.25.171.138 u=... u=... t=[20/Nov/2015:12:44:12 +0900] "r=POST /login.action HTTP/1.1
h=10.25.171.138 u=... u=... t=[20/Nov/2015:12:44:37 +0900] "r=POST /menu.action HTTP/1.1
h=10.25.171.138 u=... u=... t=[20/Nov/2015:12:45:25 +0900] "r=POST /list-order.action HTTP/1.1
h=10.25.171.138 u=... u=... t=[20/Nov/2015:12:46:14 +0900] "r=POST /view-order.action?id=2 HTTP/1.1
h=10.25.171.138 u=... u=... t=[20/Nov/2015:12:46:24 +0900] "r=POST /menu.action HTTP/1.1
h=10.25.171.138 u=... u=... t=[20/Nov/2015:12:46:34 +0900] "r=GET /logout.action HTTP/1.1
```

FIG.9B

| # | LOG ENDPOINT |
|---|---|
| 1 | POST /login.action |
| 2 | POST /menu.action |
| 3 | POST /view-customer-info.action |
| 4 | POST /edit-customer-info.action |
| 5 | POST /menu.action |
| 6 | GET /logout.action |
| 7 | POST /login.action |
| 8 | POST /menu.action |
| 9 | POST /search-product.action |
| 10 | POST /view-product.action?id=1 |
| 11 | POST /edit-cart.action |
| 12 | POST /create-order.action |
| 13 | POST /confirm-order.action?id=2&discount-service=122 |
| 14 | POST /succeed-order.action |
| 15 | POST /menu.action |
| 16 | POST /logout.action |
| 17 | POST /login.action |
| 18 | POST /menu.action |
| 19 | POST /list-order.action |
| 20 | POST /view-order.action?id=2 |
| 21 | POST /menu.action |
| 22 | GET /logout.action |

FIG.10

| # | LOG ENDPOINT | VERB | NOUN #1 | NOUN #2 | NOUN #3 |
|---|---|---|---|---|---|
| 1 | POST /login.action | login | | | |
| 2 | POST /menu.action | | | | |
| 3 | POST /view-customer-info.action | view | customer | | |
| 4 | POST /edit-customer-info.action | edit | customer | | |
| 5 | POST /menu.action | | | | |
| 6 | GET /logout.action | logout | | | |
| 7 | POST /login.action | login | | | |
| 8 | POST /menu.action | | | | |
| 9 | POST /search-product.action | search | product | | |
| 10 | POST /view-product.action?id=1 | view | product | id | |
| 11 | POST /edit-cart.action | edit | | | |
| 12 | POST /create-order.action | create | order | | |
| 13 | POST /confirm-order.action?id=2&discount-service=122 | confirm | order | discount-service | id |
| 14 | POST /succeed-order.action | succeed | order | | |
| 15 | POST /menu.action | | | | |
| 16 | POST /logout.action | logout | | | |
| 17 | POST /login.action | login | | | |
| 18 | POST /menu.action | | | | |
| 19 | POST /list-order.action | list | order | | |
| 20 | POST /view-order.action?id=2 | view | order | id | |
| 21 | POST /menu.action | | | | |
| 22 | GET /logout.action | logout | | | |

FIG.11

| VERB | HTTP METHOD |
|---|---|
| View | GET |
| List | GET |
| Search | GET |
| Succeed | GET |
| Create | POST |
| Confirm | POST |
| Edit | POST |
| Edit | PUT |
| Delete | DELETE |
| Edit | PATCH |

FIG.12

| # | HTTP METHOD | PATH | CORRESPONDING SCREEN INFORMATION |
|---|---|---|---|
| 1 | | | POST /login.action |
| 2 | | | POST /menu.action |
| 3 | GET | /customer/:id | POST /view-customer-info.action |
| 4 | PUT, PATCH, DELETE | /customer/:id | POST /edit-customer-info.action |
| 5 | | | POST /menu.action |
| 6 | | | GET /logout.action |
| 7 | | | POST /login.action |
| 8 | | | POST /menu.action |
| 9 | GET | /product | POST /search-product.action |
| 10 | GET | /product/:id | POST /view-product.action?id=1 |
| 11 | | | POST /edit-cart.action |
| 12 | POST | /order | POST /create-order.action |
| 13 | POST | /order/:id/discount-service | POST /confirm-order.action?id=2&discount-service=122 |
| 14 | GET | /order/:id | POST /succeed-order.action |
| 15 | | | POST /menu.action |
| 16 | | | POST /logout.action |
| 17 | | | POST /login.action |
| 18 | | | POST /menu.action |
| 19 | GET | /order | POST /list-order.action |
| 20 | GET | /order/:id | POST /view-order.action?id=2 |
| 21 | | | POST /menu.action |
| 22 | | | GET /logout.action |

FIG.13

| # | URL | HTTP METHOD | CORRESPONDING SCREEN INFORMATION |
|---|---|---|---|
| 1 | /customers/:id | GET | /view-customer-info |
| 2 | /customers/:id | PUT, PATCH, DELETE | /edit-customer-info |
| 3 | /orders | GET | /list-order |
| 4 | /orders | POST | /create-order |
| 5 | /orders/:id | GET | /view-order?id=, /succeed-order |
| 6 | /products | GET | /search-product |
| 7 | /products/:id | GET | /view-product?id= |
| 8 | /orders/:id/discount-services | POST | /confirm-order.action?id=2&discount-service=122 |

INFORMATION PROCESSING DEVICE AND SPECIFICATION CREATION METHOD

CROSS-REFERENCE TO RELATED APPLICATION(S)

This application is based upon and claims the benefit of priority of the prior Japanese Patent Application No. 2016-194423, filed on Sep. 30, 2016, the entire contents of which are incorporated herein by reference.

FIELD

The embodiment discussed herein is related to an information processing device and a specification creation method.

BACKGROUND

An Application Programming Interface (API) is an interface provided to use data and a function from an application (hereinafter, simply called "App"), and is created and released by a provider of the data or a developer of the function. By newly providing a Web API in an existing Web App, the data and the function of the existing Web App can be used from other apps via Web without being conscious of physical locations.

FIG. 20 is a diagram for explaining a Web API. FIG. 20 represents a case in which there are a Web API that provides customer data to mobile contract management being a Web App that has functions such as New Contract, Review, and Change of Customer Information and operates on a server, a Web API that provides contract data thereto, and a Web API that provides discount data thereto. By incorporating logic including the use of Web APIs into other apps, the customer data, the contract data, and the discount data of the mobile contract management can be used from other apps. The other apps may be operated on a smartphone, a tablet, a personal computer (PC), or the like.

Using these Web APIs allows services to be provided to even new customers having no chance to contact until now, and allows new services to be provided by linking data and processing between systems.

In order to use the Web API, a Web API specification which describes the specification of the Web API is needed. However, because it is unknown at the time of setting up the Web API how much the setting up of the Web API is effective, it is desired to easily create the Web API specification at low cost. Therefore, there is a technology to create a Web API specification from a source code that implements Web APIs and describes appropriate comments.

In addition, there is a conventional technology to create a design document indicating a relationship between an actually executed object and a table used for the object, based on an execution log output from an execution program.

Patent Literature 1: Japanese Laid-open Patent Publication No. 2009-230618

Non Patent Literature 1: Swagger-maven-plugin, Searched on Sep. 12, 2016, Internet <URL:http://kongchen.github.io/swagger-maven-plugin/>

However, there is a problem that it is not easy to create a source code that implements Web APIs and in which appropriate comments are described from the source code of the existing Web App. Therefore, it is desired to easily create a Web API specification without the source code that implements the Web API.

SUMMARY

According to an aspect of an embodiment, an information processing device includes a memory and a processor coupled to the memory, wherein the processor executes a process including generating an assumed endpoint, based on class relationship information indicating a relationship between classes of an existing web application, which is API specification information assumed from the relationship, referring to the class relationship information and extracting a verb and a noun, being basis of an actual endpoint which is API specification information based on an execution result, from an access log to be output when the web application is executed, generating the actual endpoint by converting the extracted verb into a method name and converting the extracted noun into a path, and identifying an endpoint included in generated assumed endpoints, as the API specification information of the web application, among generated actual endpoints.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating a table used to generate an assumed endpoint from the class relationship information;

FIG. 5 is a diagram illustrating assumed endpoints generated from the class diagram illustrated in FIG. 3;

FIG. 6 is a diagram for explaining URLs generated from Account and Operator;

FIG. 7 is a diagram illustrating an example of an assumed endpoint storage unit;

FIG. 9A is a diagram illustrating an example of a screen access log;

FIG. 9B is a diagram illustrating endpoints extracted from the screen access log.

FIG. 10 is a diagram illustrating an example of a noun-verb storage unit;

FIG. 11 is a diagram illustrating an example of a conversion information storage unit;

FIG. 12 is a diagram illustrating an example of an actual endpoint storage unit;

FIG. 13 is a diagram illustrating an example of a specification endpoint storage unit;

DESCRIPTION OF EMBODIMENTS

Preferred embodiments of the present invention will be explained with reference to accompanying drawings. The disclosed technology is not limited by the embodiments.

Figure 1:
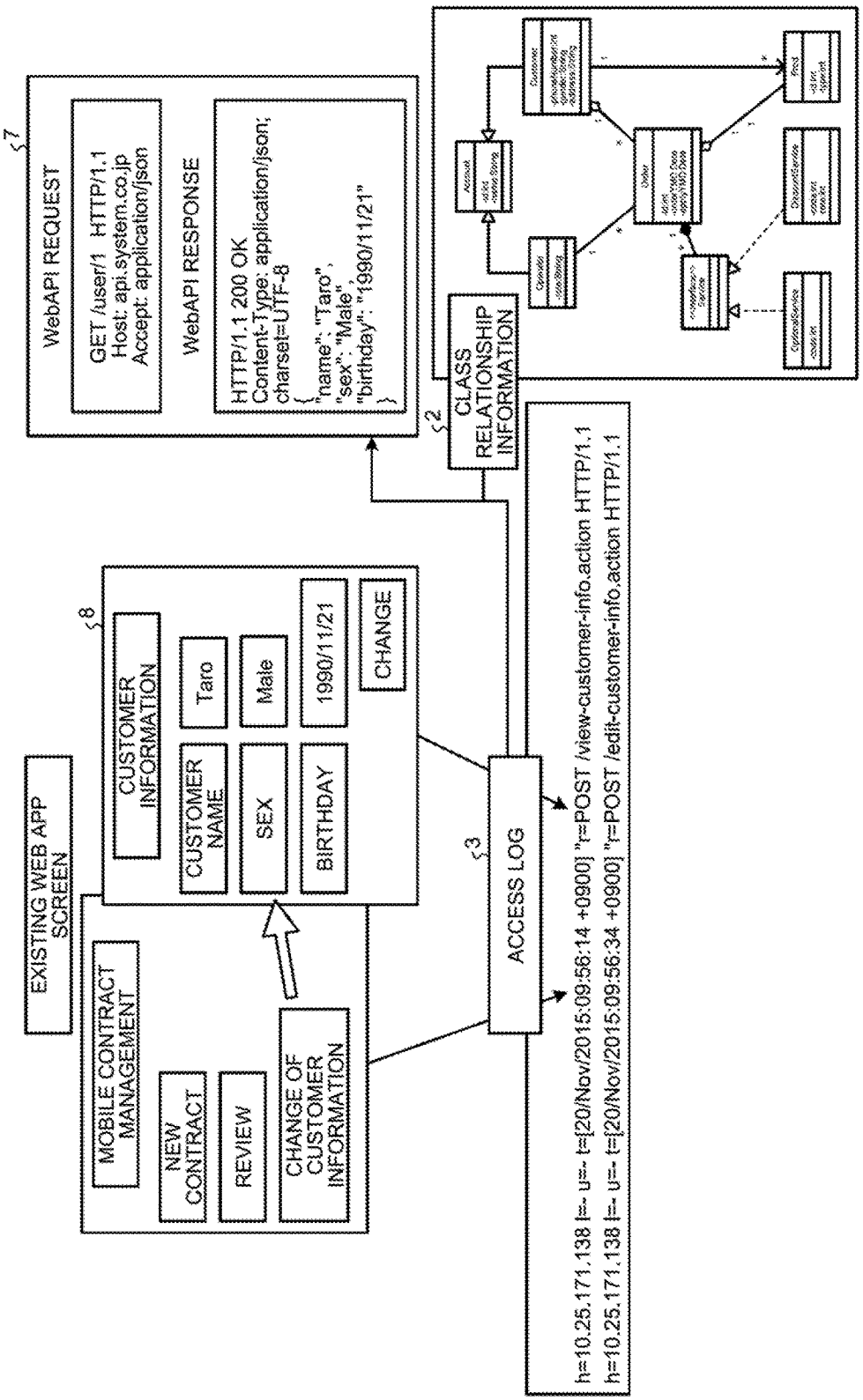
FIG. 1 is a diagram for explaining a specification creation device according to an embodiment.

First of all, a specification creation device according to an embodiment will be explained below. FIG. 1 is a diagram for explaining the specification creation device according to the embodiment. As illustrated in FIG. 1, the specification creation device according to the embodiment creates a Web API specification using class relationship information 2 which is information on a relationship between classes and an access log 3. A user requests data using the Web API based on the Web API specification, and obtains a response. A request-response 7 indicates a request and a response of the data using the Web API.

The class relationship information 2 is information represented by a class diagram. The access log 3 herein is a log output when a screen is accessed. FIG. 1 represents, in mobile contract management, an example of a log (1st row of access log 3) output when a screen 8 displaying customer information is displayed and a log (2nd row of access log 3) output when the displayed information is changed.

In the request-response 7, a Web API Request is a data acquisition request using the Web API. "GET/user/1" is called "endpoint". The endpoint is the basic information of a Web API specification. The endpoint includes a HyperText Transfer Protocol (HTTP) method name and a Uniform Resource Locator (URL) of an access destination. "GET" is an HTTP method name. "/user/1" is an access destination URL. The URL specifies information of a customer (user) identified by "1". "GET/user/1" indicates acquiring the information of the customer identified by "1".

"HTTP/1.1" indicates a protocol. "Host:" indicates a domain of an access destination. Here, the access destination is "api.system.co.jp". "Accept:" indicates a format that can be received as a response. Here, the format that can be received as a response is "application/json".

The Web API Response is a response to the data acquisition request. "200 OK" indicates that it is a normal response and its status value is "200". "Content-Type:" indicates the format of a response content. "charset=" indicates a character code. The character code herein is "UTF-8". {"name": "Taro", "sex": "Male", "birthday": "1990/11/21"} indicates acquired data.

Figure 2:
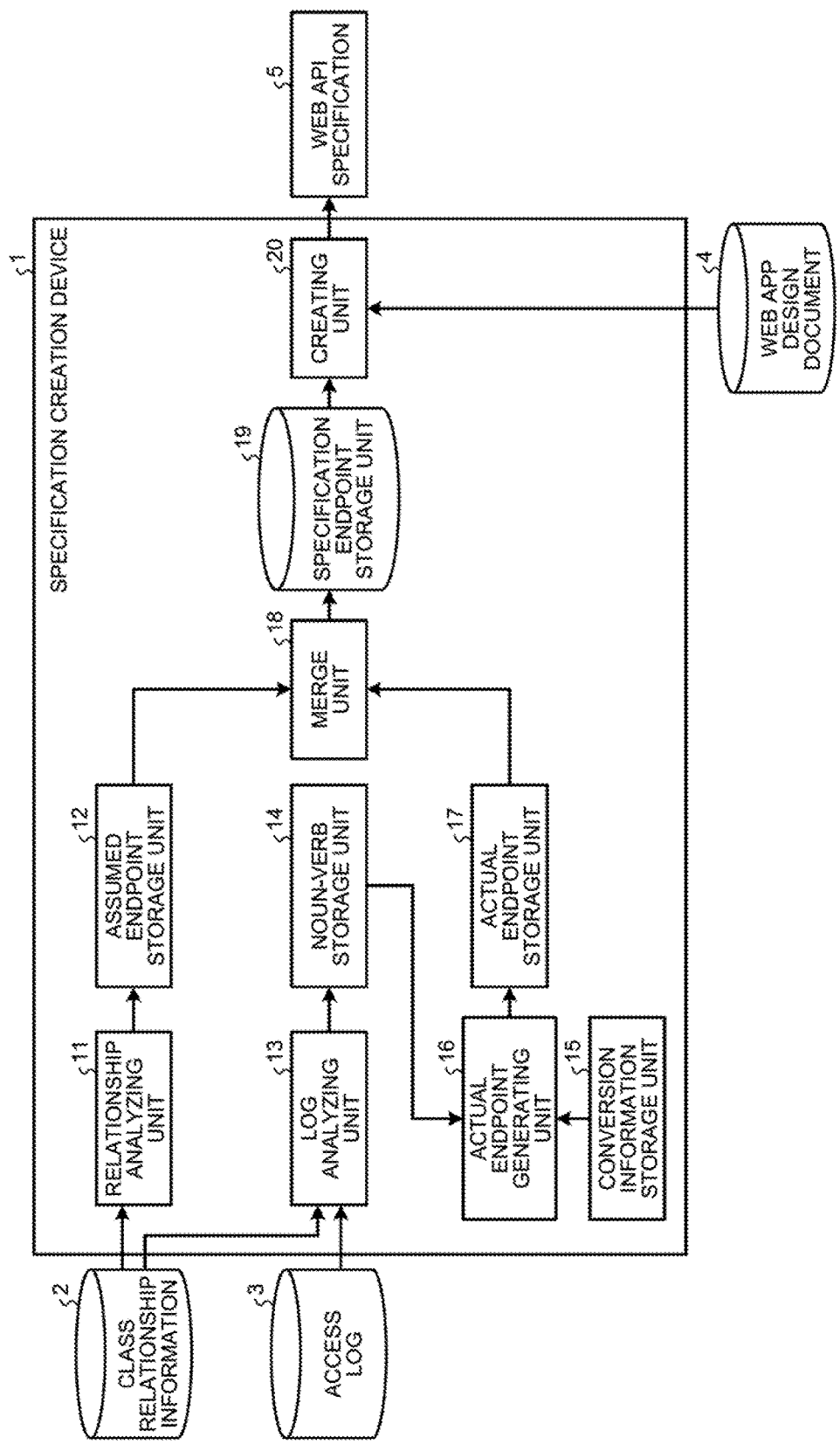
FIG. 2 is a diagram illustrating a functional configuration of the specification creation device according to the embodiment.

A functional configuration of the specification creation device according to the embodiment will be explained next. FIG. 2 is a diagram illustrating the functional configuration of the specification creation device according to the embodiment. As illustrated in FIG. 2, a specification creation device 1 includes a relationship analyzing unit 11, an assumed endpoint storage unit 12, a log analyzing unit 13, a noun-verb storage unit 14, a conversion information storage unit 15, an actual endpoint generating unit 16, an actual endpoint storage unit 17, and a merge unit 18. The specification creation device 1 also includes a specification endpoint storage unit 19 and a creating unit 20.

Figure 3:
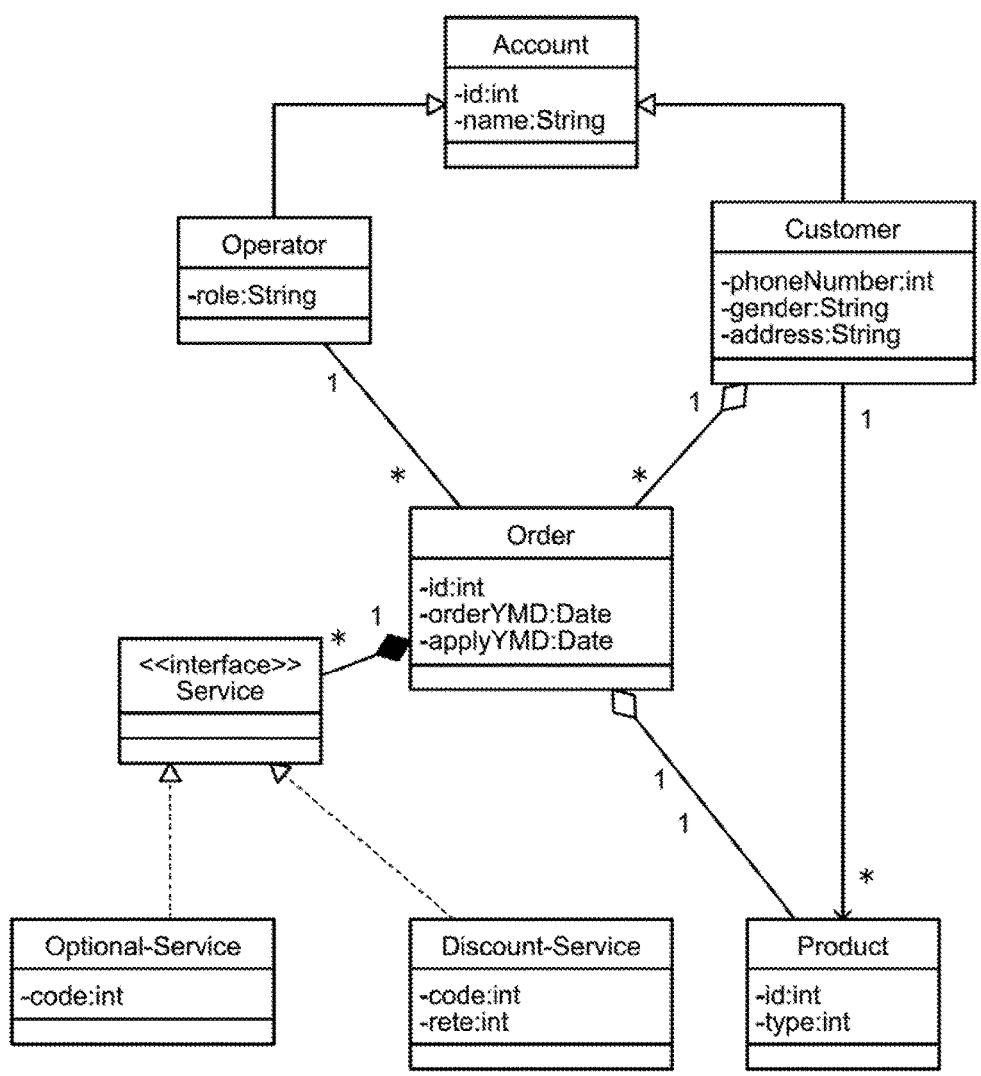
FIG. 3 is a diagram illustrating an example of a class diagram indicating class relationship information.

The relationship analyzing unit 11 receives the class relationship information 2 from a file, and generates an assumed endpoint based on the class relationship information 2. Here, the assumed endpoint is an endpoint assumed from the class relationship information 2. FIG. 3 is a diagram illustrating an example of the class diagram indicating the class relationship information 2. Squares in FIG. 3 represent classes. Class information includes class name, name, and type.

For example, a class named "Account" includes an integer type name "id" and a character type "name". <<interface>> indicates that the class is an interface class. For example, a class named "Service" is an interface class.

A link between classes represents a relationship between classes. A solid line represents a bidirectional relationship (BiDirected Association). A symbol "→" represents a unidirectional relationship (Directed Association). An arrow with a solid line whose arrow head is depicted as a white diamond represents a relationship of basic aggregation (Basic Aggregation). An arrow with a solid line whose arrow head is depicted as a black diamond represents a relationship of composite aggregation (Composition Aggregation). An arrow with a solid line whose arrow head is depicted as a white triangle represents a relationship of inheritance (Inheritance). An arrow with a dashed line whose arrow head is depicted as a white triangle represents a relationship of realization (Realization).

Information on multiplicity is added to links between classes. The multiplicity has "One to One", "One to Many (*)", "Many (*) to One", and "Many (*) to Many (*)".

FIG. 4 is a diagram illustrating a table used to generate an assumed endpoint from the class relationship information 2. The relationship analyzing unit 11 generates all the URLs that can be generated by using one or two of names of two related classes. Signs pa and pb in FIG. 4 are class names. A symbol "*" added to the class name indicates that the class is the interface class. In addition, ":id" is an identifier for identifying an instance.

Generated URLs are represented in a first column in FIG. 4. However, the first column indicates a case where pa and pb are not interface classes. The relationship analyzing unit 11 determines whether pa is an interface class, and adds "*" to the name of pa when it is an interface class. A second column indicates URLs generated when pa is an interface class.

Then, the relationship analyzing unit 11 determines what the multiplicity of pa is, and excludes an unexpected URL based on the determination result. As illustrated in FIG. 4, a row corresponding to the URL excluded in a third column (multiplicity of pa: One) or in a fourth column (multiplicity of pa: Many) is indicated by "x". For example, when the multiplicity of pa is One, the URL including "/pa/:id" is not assumed and is therefore excluded.

The relationship analyzing unit 11 also determines whether pb is an interface class, and adds "*" to pb when it is an interface class. A fifth column represents URLs generated when pb is an interface class. Then, the relationship analyzing unit 11 excludes an unexpected URL based on the relationship between pa and pb and the multiplicity.

FIG. 5 is a diagram illustrating assumed endpoints generated from the class diagram illustrated in FIG. 3. There are nine links in FIG. 3, and class names at both ends in each of the nine links and URLs to be excluded are represented in second to 10th columns of FIG. 5. For example, because "Account" and "Operator" are not interface classes and the relationship between "Account" and "Operator" is a relationship of inheritance, the URLs other than /pa, /pa/:id, /pb, and /pb/:id are excluded based on the 18th column in FIG. 4.

FIG. 6 is a diagram for explaining URLs generated from "Account" and "Operator". FIG. 6(a) represents all the generable URLs, and FIG. 6(b) represents the URLs after unexpected URLs are excluded based the relationship between "Account" and "Operator". In the URLs, the capital letter of a class name is converted into a small letter. The class name is converted into plural form.

The assumed endpoint storage unit 12 stores assumed endpoints generated by the relationship analyzing unit 11. FIG. 7 is a diagram illustrating an example of the assumed endpoint storage unit 12. FIG. 7 depicts URLs generated from the class diagram illustrated in FIG. 3. An assumed endpoint is a combination of each of the URLs in FIG. 7 with any one of HTTP method names such as GET, POST, PUT, DELETE, and PATCH. About "/accounts", for example, GET /accounts, POST /accounts, PUT /accounts, DELETE /accounts, and PATCH /accounts are assumed endpoints.

The log analyzing unit 13 receives the access log 3 from the file, extracts a verb and a noun corresponding to the verb from each log of the access log 3, and stores the extracted verb and noun as the noun-verb information in the noun-verb storage unit 14. The number of corresponding nouns may be plural, or 0 in some cases. The log analyzing unit 13 refers to the class relationship information 2 when extracting a noun, and extracts the class name as the noun.

Figure 8:
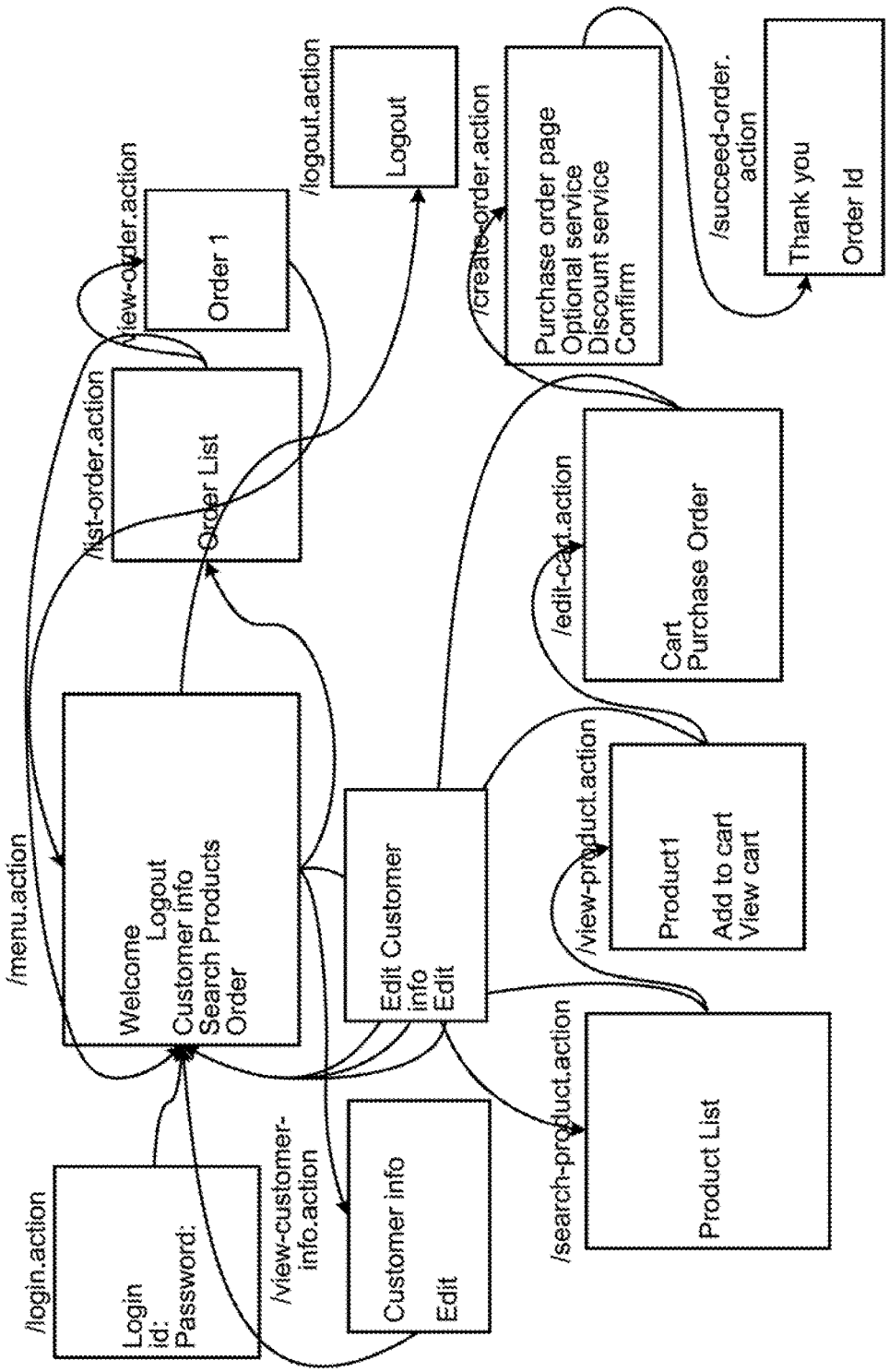
FIG. 8 is a diagram illustrating screen transition of Web Apps corresponding to the class diagram illustrated in FIG. 3.

For example, the log analyzing unit 13 extracts a verb and a noun corresponding to the verb from each log of a screen access log. FIG. 8 is a diagram illustrating screen transition of Web Apps corresponding to the class diagram illustrated in FIG. 3. As illustrated in FIG. 8, the square represents a web page corresponding to the screen, and a path (screen name) of the web page is represented above the square.

FIG. 9A is a diagram illustrating an example of the screen access log. FIG. 9A represents the screen access log when a Web App that performs the screen transition illustrated in FIG. 8 is executed. FIG. 9B represents log endpoints which are endpoints extracted from the screen access log. The log endpoint is extracted from the part after "'r=' in the screen access log. For example, "POST /login.action" is extracted as a log endpoint from the part after "'r=' in the log of a first row.

The noun-verb storage unit 14 stores a verb and a noun extracted from the access log 3 for each log endpoint. FIG. 10 is a diagram illustrating an example of the noun-verb storage unit 14. As illustrated in FIG. 10, the noun-verb storage unit 14 stores a verb and a noun or nouns extracted as a log endpoint in association with each other. Up to three nouns are stored in FIG. 10. For example, "view" is extracted as a verb from "POST /view-customer-info.action" and "customer" is extracted as a noun therefrom.

The conversion information storage unit 15 stores information associating a verb extracted from the access log 3 with an HTTP method name. FIG. 11 is a diagram illustrating an example of the conversion information storage unit 15. As illustrated in FIG. 11, the conversion information storage unit 15 associates a verb with an HTTP method name. For example, verbs "View", "List", "Search", and "Succeed" are associated with the HTTP method name "GET". The conversion information stored in the conversion information storage unit 15 is created by using synonyms in a dictionary.

For a verb having a noun among the verbs stored in the noun-verb storage unit 14, the actual endpoint generating unit 16 refers to the conversion information storage unit 15 to convert the verb into the HTTP method, and generates a path (URL) from the noun, and thereby generates an actual endpoint. Then, the actual endpoint generating unit 16 stores the generated actual endpoint in the actual endpoint storage unit 17. Here, the actual endpoint indicates an endpoint generated from a log output when the Web App is actually executed.

The actual endpoint storage unit 17 stores actual endpoints. FIG. 12 is a diagram illustrating an example of the actual endpoint storage unit 17. An actual endpoint in FIG. 12 is stored by being separated into the HTTP method and the path. In addition, an actual endpoint is associated with a screen based on corresponding screen information. For example, an actual endpoint "GET /customer/:id" in the third row of the actual endpoint storage unit 17 is generated by the actual endpoint generating unit 16 from the endpoint in the third row of the noun-verb storage unit 14 illustrated in FIG. 10. Incidentally, "/:id" is added by the actual endpoint generating unit 16 when the HTTP method name is "GET", "PUT", "DELETE", or "PATCH".

The merge unit 18 merges the assumed endpoints and the actual endpoints, generates a specification endpoint used for the Web API specification, and stores it in the specification endpoint storage unit 19. Specifically, the merge unit 18 determines an endpoint included in the assumed endpoints among the actual endpoints as a specification endpoint.

The specification endpoint storage unit 19 stores specification endpoints. FIG. 13 is a diagram illustrating an example of the specification endpoint storage unit 19. The specification endpoint in FIG. 13 is stored by being separated into the path and the HTTP method. In addition, the specification endpoint is associated with a screen based on corresponding screen information. For example, the actual endpoint in the third row of the actual endpoint storage unit 17 illustrated in FIG. 12 is generated as a specification endpoint because the path "customer/:id" is in the sixth row of the URLs of the assumed endpoints illustrated in FIG. 7. Incidentally, the difference between singular form and plural form of noun such as customer is ignored.

The creating unit 20 creates a Web API specification 5 using the specification endpoint and a Web App design document 4. The Web API specification 5 includes a description on the request and a description on the response. The description on the request includes a description on the endpoint, and the specification endpoint is used. The description on the response includes, for example, a schema of data to be acquired, and the schema of the data is extracted from the Web App design document 4.

Figure 14:
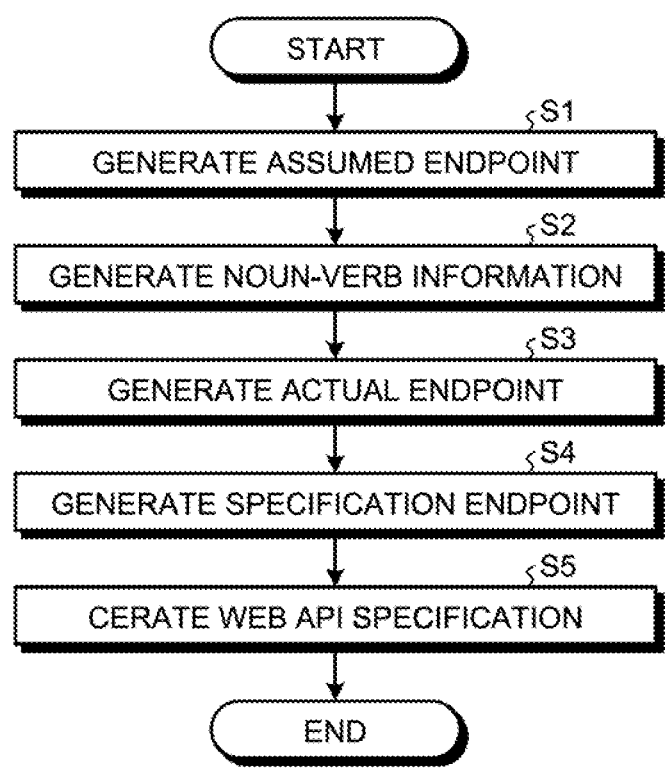
FIG. 14 is a flowchart illustrating a flow of specification creation processing.

A flow of specification creation processing will be explained next. FIG. 14 is a flowchart illustrating a flow of specification creation processing. As illustrated in FIG. 14, the specification creation device 1 generates assumed endpoints using the class relationship information 2 (Step S1), and generates noun-verb information from the access log 3 (Step S2).

Then, the specification creation device 1 generates actual endpoints from the noun-verb information (Step S3), and merges the assumed endpoints and the actual endpoints to generate specification endpoints (Step S4). The specification creation device 1 then creates the Web API specification 5 using the specification endpoints and the Web App design document 4 (Step S5).

The specification creation device 1 creates the Web API specification 5 using the class relationship information 2 and the access log 3 in this manner, so that the Web API specification can be created even if there is no source code that implements the Web API.

Figure 15A:
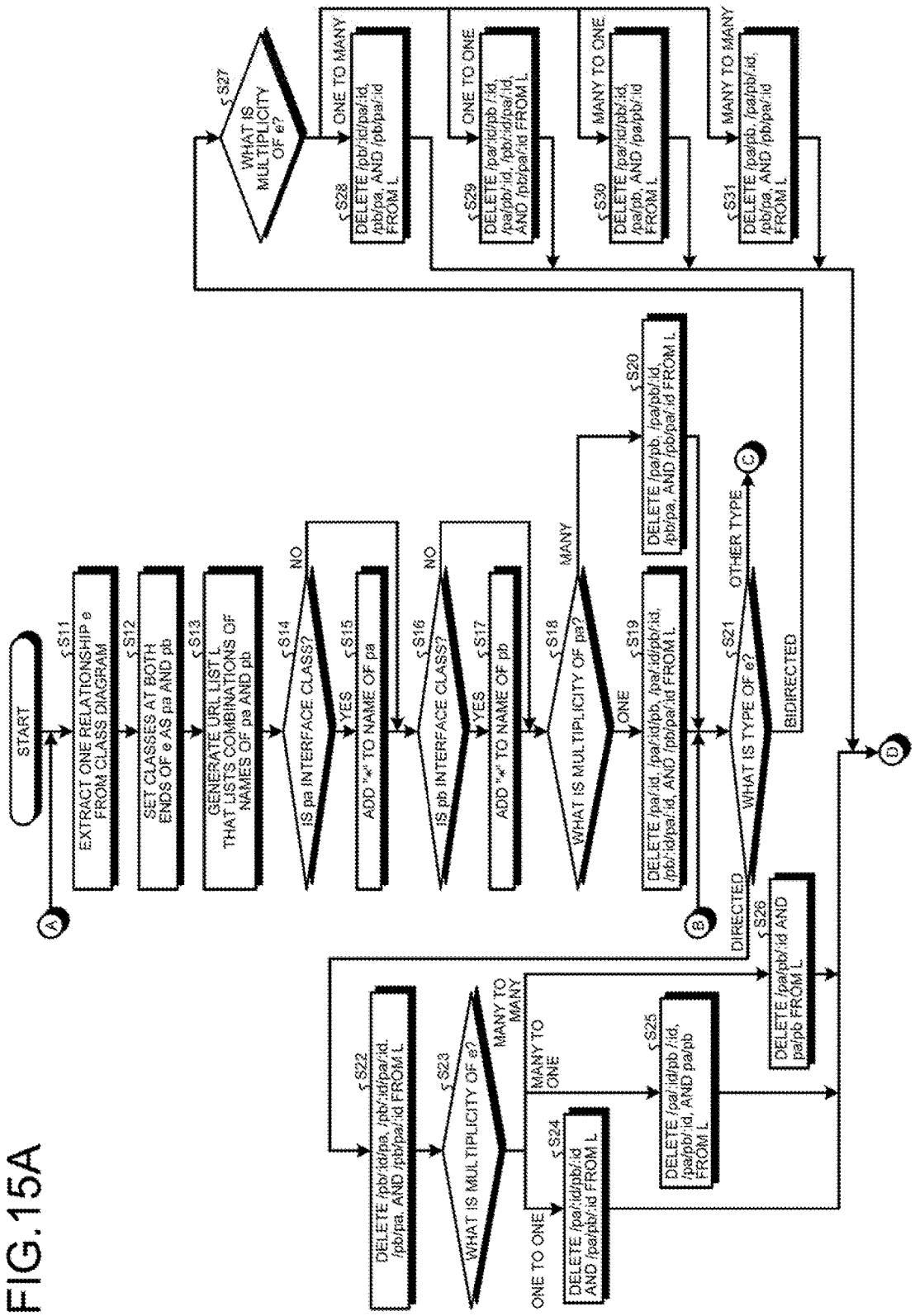
FIG. 15A is a first flowchart illustrating a flow of processing for generating an assumed endpoint.
Figure 15B:
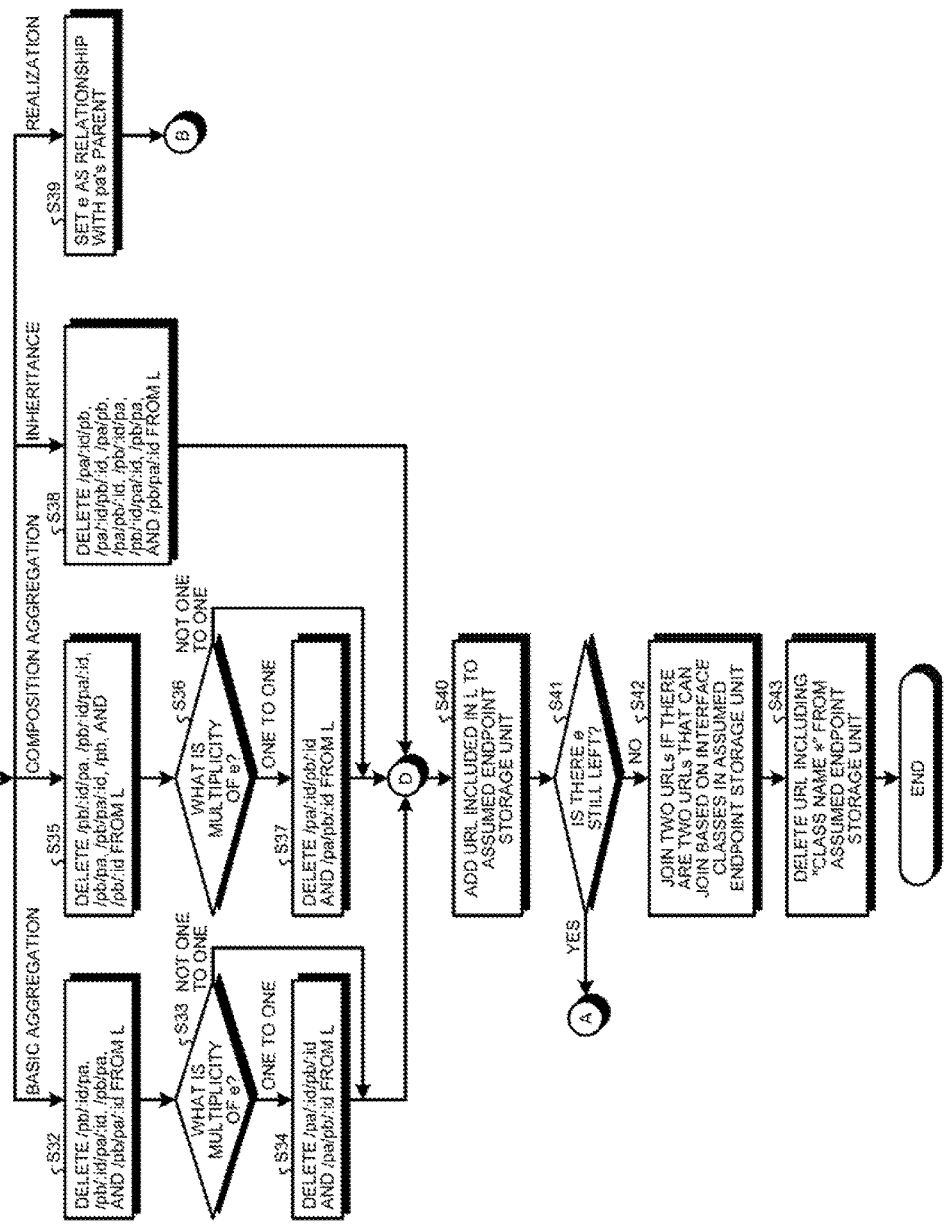
FIG. 15B is a second flowchart illustrating a flow of the processing for generating the assumed endpoint.

The processing for generating the assumed endpoint will be explained next. FIG. 15A and FIG. 15B are flowcharts illustrating a flow of the processing for generating an assumed endpoint. As illustrated in FIG. 15A, the relationship analyzing unit 11 extracts one relationship e from the class diagram using the class relationship information 2 (Step S11), and sets the classes at both ends of e as pa and pb (Step S12).

Then, the relationship analyzing unit 11 generates a URL list L that lists combinations of names of pa and pb (Step S13). The URL list L is, for example, a list of URLs illustrated in the first column of FIG. 4. The relationship analyzing unit 11 determines whether pa is an interface class (Step S14), and adds "*" to each name of pa in the URLs when it is an interface class (Step S15). Then, the relationship analyzing unit 11 determines whether pb is an interface class (Step S16), and adds "*" to each name of pb in the URLs when it is an interface class (Step S17). In addition, in the subsequent processing of Step S19 to Step S39, "pa" represents both "pa" and "pa*", and "pb" represents both "pb" and "pb*".

The relationship analyzing unit 11 then determines what the multiplicity of pa is (Step S18) and deletes, when it is One, /pa/:id, /pa/:id/pb, /pa/:id/pb/:id, /pb/;id/pa./:id, and /pb/pa/:id from L (Step S19). Meanwhile, when the multiplicity of pa is Many, the relationship analyzing unit 11 deletes /pa/pb, /pa/pb/:id, /pb/pa, and /pb/pa/:id from L (Step S20).

Subsequently, the relationship analyzing unit 11 determines what the type of e is (Step S21) and deletes, when it is "Directed", /pb/:id/pa, /pb/;id/pa/:id, /pb/pa, and /pb/pa/:id from L (Step S22). The relationship analyzing unit 11 then determines what the multiplicity of e is (Step S23) and deletes, when it is "One to One", /pa/:id/pb/:id and /pa/pb/:id from L (Step S24), and proceeds to Step S40. When the multiplicity of e is "Many to One", the relationship analyzing unit 11 deletes /pa/:id/pb /:id, /pa/pb/:id, and pa/pb from L (Step S25), and proceeds to Step S40. When the multiplicity of e is "Many to Many", the relationship analyzing unit 11 deletes /pa/pb/:id and pa/pb from L (Step S26), and proceeds to Step S40.

When the type of e is "BiDirected", the relationship analyzing unit 11 determines what the multiplicity of e is (Step S27) and deletes, when it is "One to Many", /pb/:id/ pa/:id, /pb/pa, and /pb/pa/:id from L (Step S28), and proceeds to Step S40. When it is "One to One", the relationship analyzing unit 11 deletes /pa/:id/pb /:id, /pa/pb/:id, /pb/:id/ pa/:id, and /pb/pa/:id from L (Step S29), and proceeds to Step S40. When it is "Many to One", the relationship analyzing unit 11 deletes /pa/:id/pb/:id, /pa/pb, and /pa/pb/: id from L (Step S30), and proceeds to Step S40. Moreover, when if is "Many to Many", the relationship analyzing unit 11 deletes /pa/pb, /pa/pb/:id, /pb/pa, and /pb/pa/:id from L (Step S31), and proceeds to Step S40.

When the type of e is "Basic Aggregation", as illustrated in FIG. 15B, the relationship analyzing unit 11 deletes /pb/:id/pa, /pb/:id/pa/:id, /pb/pa, and /pb/pa/:id from L (Step S32). Then, the relationship analyzing unit 11 determines what the multiplicity of e is (Step S33) and deletes, when it is "One to One", /pa/:id/pb/:id and /pa/pb/:id from L (Step S34). The relationship analyzing unit 11 then proceeds to Step S40.

When the type of e is "Composition Aggregation", the relationship analyzing unit 11 deletes /pb/:id/pa, /pb/:id/pa/: id, /pb/pa, /pb/:id/pb, and /pb/:id from L (Step S35).

Then, the relationship analyzing unit 11 determines what the multiplicity of e is (Step S36) and deletes, when it is "One to One", /pa/:id/pb/:id and /pa/pb/:id from L (Step S37). The relationship analyzing unit 11 then proceeds to Step S40.

When the type of e is "Inheritance", the relationship analyzing unit 11 deletes /pa/:id/pb, /pa/:id/pb/:id, /pa/pb, /pa/pb/:id, /pb/:id/pa, /pb/:id/pa/:id, /pb/pa, and /pb/pa/:id from L (Step S38). The relationship analyzing unit 11 then proceeds to Step S40.

When the type of e is "Realization", the relationship analyzing unit 11 sets e as a relationship with pa's parent (Step S39), and returns to Step S21.

The relationship analyzing unit 11 adds the URLs included in L to the assumed endpoint storage unit 12, (Step S40), and determines whether there is any e still left (Step S41). When there is e still left, the relationship analyzing unit 11 returns to Step S11.

Meanwhile, when there is no e left, and if there are two URLs that can join based on the interface classes in the assumed endpoint storage unit 12, the relationship analyzing unit 11 joins the two URLs (Step S42). For example, if there are "/x/y*" and "/y*/z", the relationship analyzing unit 11 joins the two URLs to "/x/z". Then, the relationship analyzing unit 11 deletes the URL including "class name*" from the assumed endpoint storage unit 12 (Step S43). By the processing at Step S42 and Step S43, the relationship analyzing unit 11 can remove the URL including the interface class name from the URLs stored in the assumed endpoint storage unit 12.

Thus, the relationship analyzing unit 11 can generate an assumed endpoint by generating a URL based on the type and the multiplicity of a relationship between two classes for each relationship.

Figure 16:
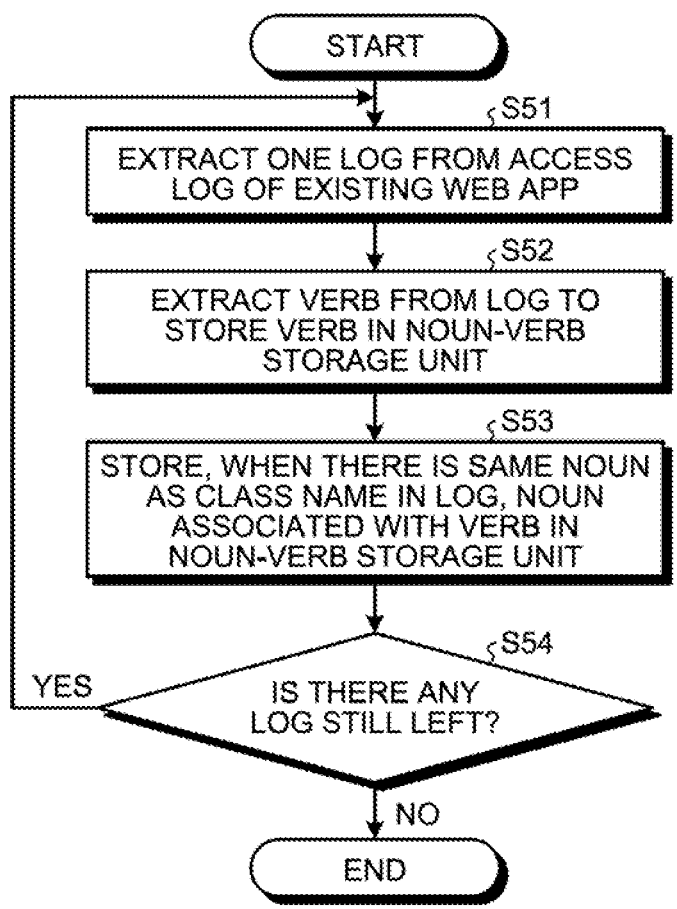
FIG. 16 is a flowchart illustrating a flow of processing for generating noun-verb information.

A flow of processing for generating noun-verb information will be explained next. FIG. 16 is a flowchart illustrating a flow of processing for generating noun-verb information. As illustrated in FIG. 16, the log analyzing unit 13 extracts one log from the access log 3 of the existing Web App (Step S51).

Then, the log analyzing unit 13 extracts a verb from the log to store the verb in the noun-verb storage unit 14 (Step S52). When there is the same noun as the class name in the log, the log analyzing unit 13 stores the noun associated with the verb in the noun-verb storage unit 14 (Step S53).

The log analyzing unit 13 determines whether there is any log still left (Step S54), returns to Step S51 when there is any log left, and ends the processing when there is no log left.

Thus, the log analyzing unit 13 generates the noun-verb information from the access log 3, so that the actual endpoint generating unit 16 can generate an actual endpoint.

Figure 17:
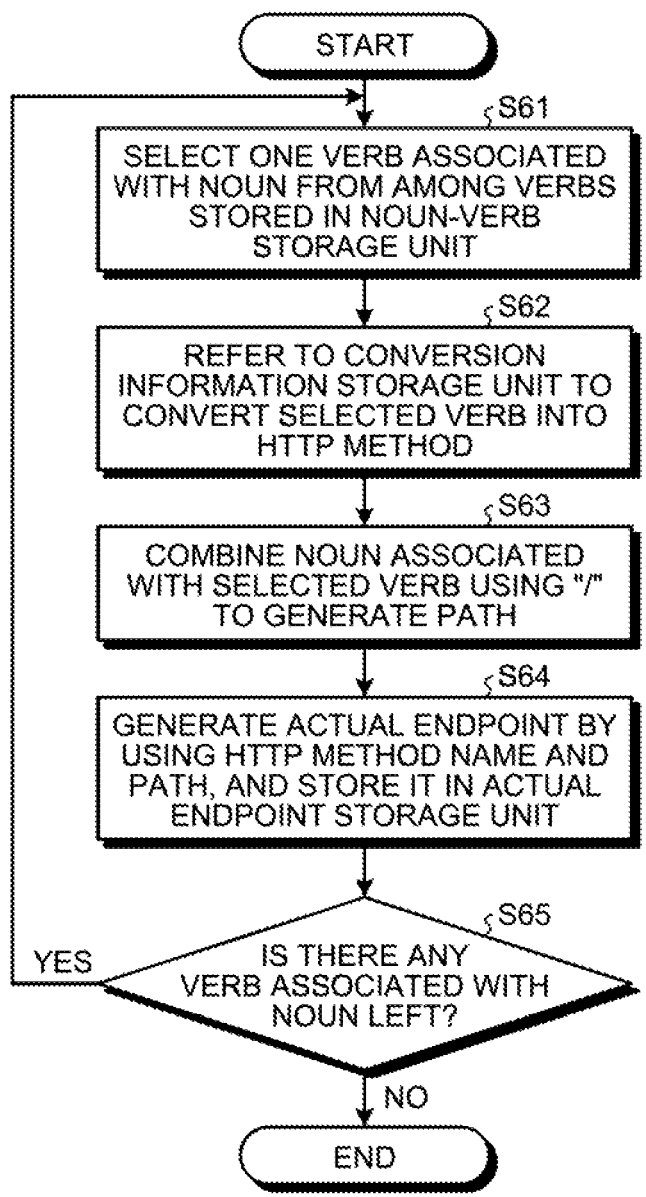
FIG. 17 is a flowchart illustrating a flow of processing for generating an actual endpoint.

A flow of processing for generating an actual endpoint will be explained next. FIG. 17 is a flowchart illustrating a flow of processing for generating an actual endpoint. As illustrated in FIG. 17, the actual endpoint generating unit 16 selects one verb associated with a noun from among the verbs stored in the noun-verb storage unit 14 (Step S61).

Then, the actual endpoint generating unit 16 refers to the conversion information storage unit 15 to convert the selected verb into an HTTP method name (Step S62). The actual endpoint generating unit 16 combines the noun associated with the selected verb using "/" to generate a path (Step S63).

Subsequently, the actual endpoint generating unit 16 generates an actual endpoint by using the HTTP method name and the path, and stores it in the actual endpoint storage unit 17 (Step S64). The actual endpoint generating unit 16 then determines whether there is any verb associated with the noun left (Step S65), returns to Step S61 when there is any verb left, and ends the processing when there is no verb left.

Thus, the actual endpoint generating unit 16 can generate a candidate of the specification endpoint by generating the actual endpoint using the noun-verb information.

Figure 18:
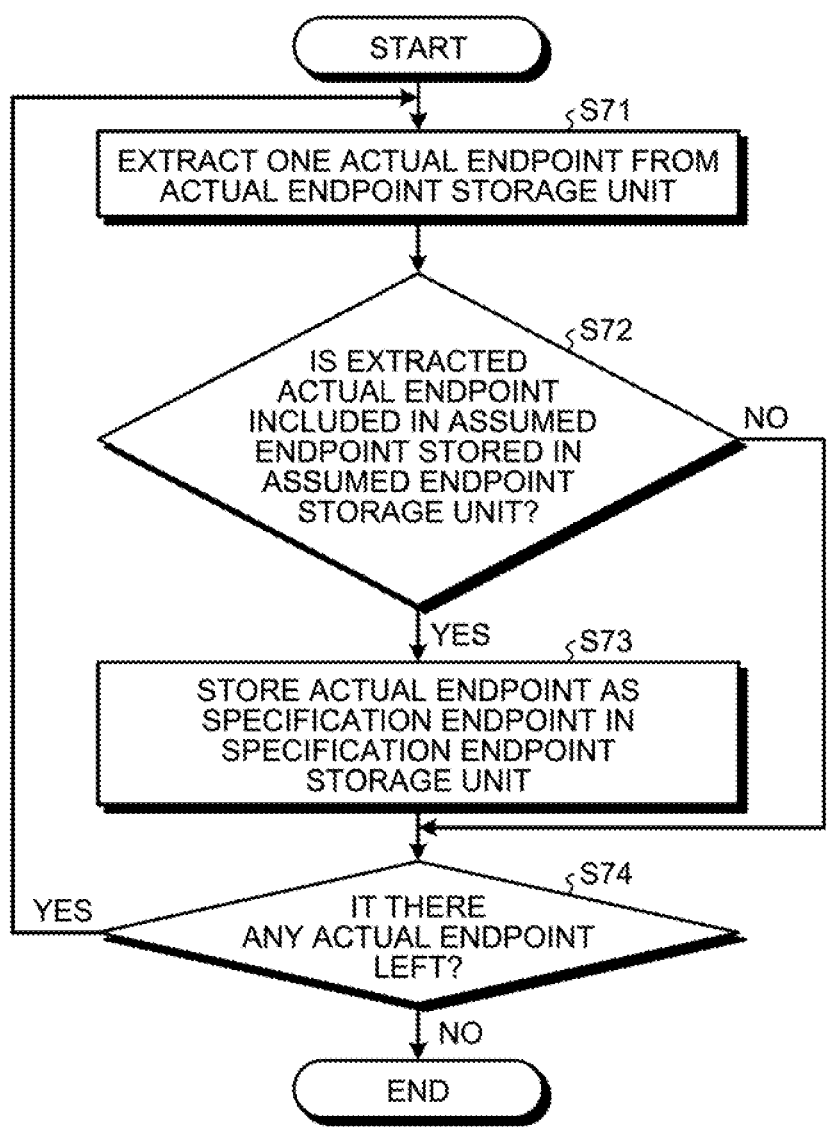
FIG. 18 is a flowchart illustrating a flow of processing for generating a specification endpoint.

A flow of processing for generating a specification endpoint will be explained next. FIG. 18 is a flowchart illustrating a flow of processing for generating a specification endpoint. As illustrated in FIG. 18, the merge unit 18 extracts one actual endpoint from the actual endpoint storage unit 17 (Step S71).

Then, the merge unit 18 determines whether the extracted actual endpoint is included in the assumed endpoint stored in the assumed endpoint storage unit 12 (Step S72), and proceeds to Step S74 when it is not includes in the assumed endpoint.

Meanwhile, when the extracted actual endpoint is included in the assumed endpoint stored in the assumed endpoint storage unit 12, the merge unit 18 stores the actual endpoint as the specification endpoint in the specification endpoint storage unit 19 (Step S73).

The merge unit 18 then determines whether there is any actual endpoint left (Step S74), returns to Step S71 when any actual endpoint is left, and ends the processing when there is no actual endpoint left.

Thus, the merge unit 18 generates the specification endpoint, so that the specification creation device 1 can create the Web API specification 5.

As explained above, in the embodiment, the relationship analyzing unit 11 generates an assumed endpoint based on the class relationship information 2. The log analyzing unit 13 refers to the class relationship information 2 to extract noun-verb information from the access log 3, and the actual endpoint generating unit 16 converts the verb of the noun-verb information into the HTTP method name and converts the noun to the path to thereby generate an actual endpoint. The merge unit 18 identifies an endpoint, among the actual endpoints, included in the assumed endpoints generated by the relationship analyzing unit 11 as a specification endpoint. Therefore, the specification creation device 1 can utilize the specification endpoint as information on the Web API specification.

In the embodiment, the creating unit 20 creates the Web API specification 5 based on the specification endpoint and the Web App design document 4. Therefore, the specification creation device 1 can automatically create the Web API specification 5.

In the embodiment, the log analyzing unit 13 uses only the noun, as a path, included in the class relationship information 2 as the class name among the nouns in the noun-verb information. Therefore, the actual endpoint generating unit 16 can generate the actual endpoint consistent with the class relationship information 2.

In the embodiment, the relationship analyzing unit 11 excludes an unexpected URL and generates an assumed endpoint based on the type of the relationship between two classes and the multiplicity between the two classes. Therefore, the specification creation device 1 can exclude the unexpected API from the Web API specification 5.

In the embodiment, by comparing the actual endpoint with the assumed endpoint based on the screen access log, the designer can grasp the class, of the class relationship information 2, in which the screen is not created, and can find the shortage of the screen.

In the embodiment, the specification creation device 1 has been explained, however, by implementing the configuration of the specification creation device 1 using software, the specification creation program having the same function can be obtained. Therefore, a computer for executing the specification creation program will be explained below.

Figure 19:
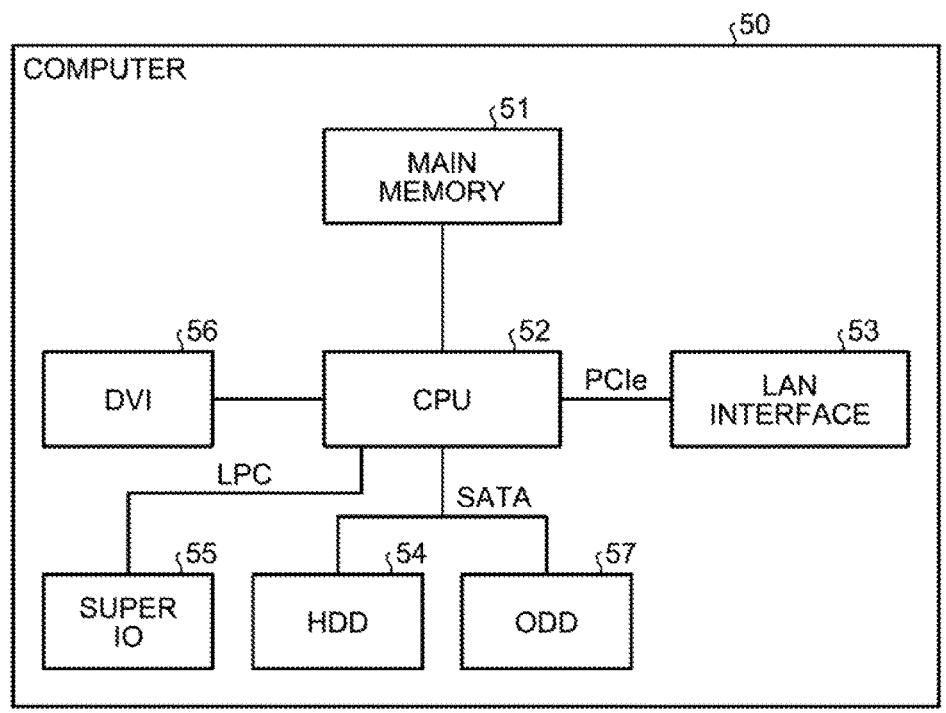
FIG. 19 is a diagram illustrating a hardware configuration of a computer that executes the specification creation program according to the embodiment.
Figure 20:
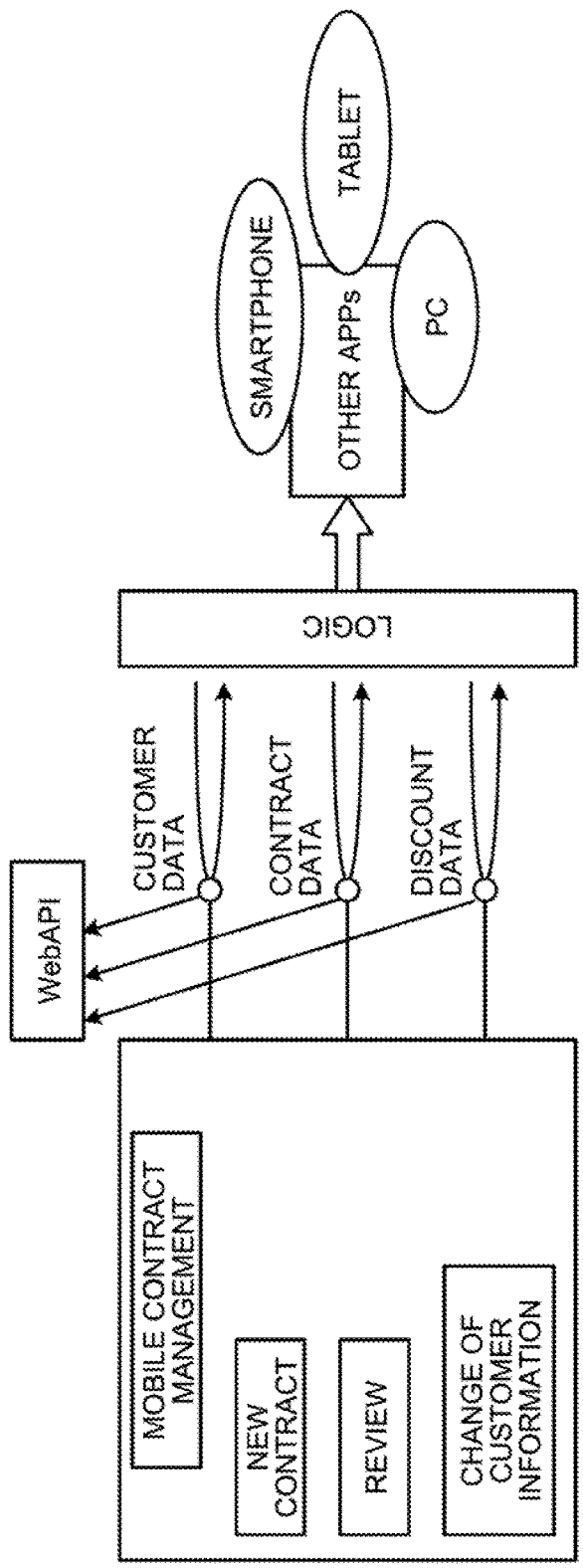
FIG. 20 is a diagram for explaining a Web API.

FIG. 19 is a diagram illustrating a hardware configuration of a computer that executes the specification creation program according to the embodiment. As illustrated in FIG. 19, a computer 50 includes a main memory 51, a Central Processing Unit (CPU) 52, a Local Area Network (LAN) interface 53, and a Hard Disk Drive (HDD) 54. The computer 50 also includes a super Input Output (IO) 55, a Digital Visual Interface (DVI) 56, and an Optical Disk Drive (ODD) 57.

The main memory 51 is a memory that stores a program, an execution intermediate result of the program, and the like. The CPU 52 is a central processing unit that reads a program from the main memory 51 and executes the program. The CPU 52 includes a chipset having a memory controller.

The LAN interface 53 is an interface for connecting the computer 50 to other computer via LAN. The HDD 54 is a disk drive that stores programs and data, and the super IO 55 is an interface for connecting an input device such as a mouse and a keyboard. The DVI 56 is an interface for connecting a liquid crystal display device, and the ODD 57 is a device that reads and writes DVDs.

The LAN interface 53 is connected to the CPU 52 through Peripheral Component Interconnect Express (PCIe), and HDD 54 and ODD 57 are connected to the CPU 52 through Serial Advanced Technology Attachment (SATA). The super IO 55 is connected to the CPU 52 through Low Pin Count (LPC).

The specification creation program executed in the computer 50 is stored in the DVD, read from the DVD by the ODD 57, and installed in the computer 50. Alternatively, the specification creation program is stored in a database or the like of the other computer connected via the LAN interface 53, read from the database, and installed in the computer 50. The installed specification creation program is stored in the HDD 54, read to the main memory 51, and executed by the CPU 52.

According to one aspect of the present invention, the Web API specification can be easily created.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
a memory; and
a processor coupled to the memory, wherein the processor executes a process comprising:
generating an assumed endpoint, based on class relationship information indicating a relationship between classes of an existing web application, which is API specification information assumed from the relationship;
referring to the class relationship information and extracting a verb and a noun, being basis of an actual endpoint which is API specification information based on an execution result, from an access log to be output when the web application is executed;

generating the actual endpoint by converting the extracted verb into a method name and converting the extracted noun into a path; and identifying an endpoint included in generated assumed endpoints, as the API specification information of the web application, among generated actual endpoints.

2. The information processing device according to claim 1, wherein the process further comprising:

creating an API specification of the web application based on the API specification information identified at the identifying and design information of the web application.

3. The information processing device according to claim 1, wherein the extracting extracts, when a noun contained in the access log is included as a class name in the class relationship information, the noun as a noun which is the basis of the actual endpoint.

4. The information processing device according to claim 1, wherein the generating the assumed endpoint generates the assumed endpoint, from all URLs generated by using one or two class names of two classes, using an URL obtained by excluding an unexpected URL based on any of Directed Association, BiDirected Association, Basic Aggregation, Composition Aggregation, Inheritance or Realization, a relationship between the two classes is and based on a relationship of multiplicity between the two classes.

5. The information processing device according to claim 1, wherein the access log is a screen access log.

6. A specification creation method executed by a computer, the method comprising:

generating an assumed endpoint, based on class relationship information indicating a relationship between classes of an existing web application, which is API specification information assumed from the relationship;

referring to the class relationship information and extracting a verb and a noun, being basis of an actual endpoint which is API specification information based on an execution result, from an access log to be output when the web application is executed;

generating the actual endpoint by converting the extracted verb into a method name and converting the extracted noun into a path; and identifying an endpoint included in generated assumed endpoints, as the API specification information of the web application, among generated actual endpoints.

7. A non-transitory computer-readable storage medium having stored therein a program that causes a computer to execute a process comprising:

generating an assumed endpoint, based on class relationship information indicating a relationship between classes of an existing web application, which is API specification information assumed from the relationship;

referring to the class relationship information and extracting a verb and a noun, being basis of an actual endpoint which is API specification information based on an execution result, from an access log to be output when the web application is executed;

generating the actual endpoint by converting the extracted verb into a method name and converting the extracted noun into a path; and identifying an endpoint included in generated assumed endpoints, as the API specification information of the web application, among generated actual endpoints.

* * * * *